United States Patent
Jeon

(10) Patent No.: US 10,479,337 B2
(45) Date of Patent: Nov. 19, 2019

(54) SOLENOID VALVE FOR BRAKE SYSTEM

(71) Applicant: MANDO CORPORATION, Gyeonggi-do (KR)

(72) Inventor: In-Wook Jeon, Seoul (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 15/896,064

(22) Filed: Feb. 14, 2018

(65) Prior Publication Data

US 2018/0229706 A1     Aug. 16, 2018

(30) Foreign Application Priority Data

Feb. 15, 2017   (KR) .................... 10-2017-0020431

(51) Int. Cl.
*F16K 31/06*     (2006.01)
*B60T 13/68*     (2006.01)
(Continued)

(52) U.S. Cl.
CPC ............ *B60T 13/686* (2013.01); *B60T 8/363* (2013.01); *B60T 13/662* (2013.01); *B60T 17/04* (2013.01);
(Continued)

(58) Field of Classification Search
CPC ...... B60T 13/686; B60T 13/662; B60T 8/363; B60T 17/04; F16K 31/0655; F16K 31/0662; F16K 31/0665; F16K 31/0689; F16K 31/0693; F16K 31/0696; B60Y 2400/81; H01F 2007/086
See application file for complete search history.

(56) References Cited

U.S. PATENT DOCUMENTS 5,984,261 A * 11/1999 Akita ................... B60T 8/363
                                                      251/118
9,090,236 B2 * 7/2015 Fricke-Schmidt .... B60T 8/3615
(Continued)

FOREIGN PATENT DOCUMENTS

KR        2003-0017296        3/2003
KR      10-2004-0084138      10/2004
(Continued)

OTHER PUBLICATIONS

Office Action dated Jun. 11, 2018 for Korean Patent Application No. 10-2017-0020431 and its English machine translation by Google Translate.

*Primary Examiner* — Ian G Paquette
(74) *Attorney, Agent, or Firm* — Ladas & Parry, LLP

(57) ABSTRACT

Disclosed is a solenoid valve for a brake system. The solenoid valve includes a valve housing installed in a bore of a modulator block and configured to include an internal flow path, a valve sheet provided at the internal flow path of the valve housing and configured to include an orifice, an armature configured to be slidably moved up and down by a magnet core and to include an opening or closing sphere configured to selectively open or close the orifice, a sleeve configured to accommodate the armature therein and to have one end coupled to the valve housing and the other end at which the magnet core is provided, and a damper guide provided at the internal flow path of the valve housing to come into contact with and surround the armature.

10 Claims, 4 Drawing Sheets

(51) Int. Cl.
   *B60T 13/66*   (2006.01)
   *B60T 17/04*   (2006.01)
   *B60T 8/36*    (2006.01)
   *H01F 7/08*    (2006.01)

(52) U.S. Cl.
   CPC ...... *F16K 31/0655* (2013.01); *F16K 31/0689* (2013.01); *B60Y 2400/81* (2013.01); *H01F 2007/086* (2013.01)

(56) References Cited

U.S. PATENT DOCUMENTS

| | | | | |
|---|---|---|---|---|
| 2013/0146796 A1* | 6/2013 | Karl | ......... | B60T 8/363 251/129.15 |
| 2014/0166914 A1* | 6/2014 | Pott | ......... | F16K 31/0665 251/129.15 |
| 2014/0354037 A1* | 12/2014 | Kam | ......... | B60T 8/363 303/119.1 |

FOREIGN PATENT DOCUMENTS

| | | |
|---|---|---|
| KR | 10-2015-0092908 | 8/2015 |
| KR | 10-2016-0097504 | 8/2016 |

* cited by examiner

[Fig. 1]
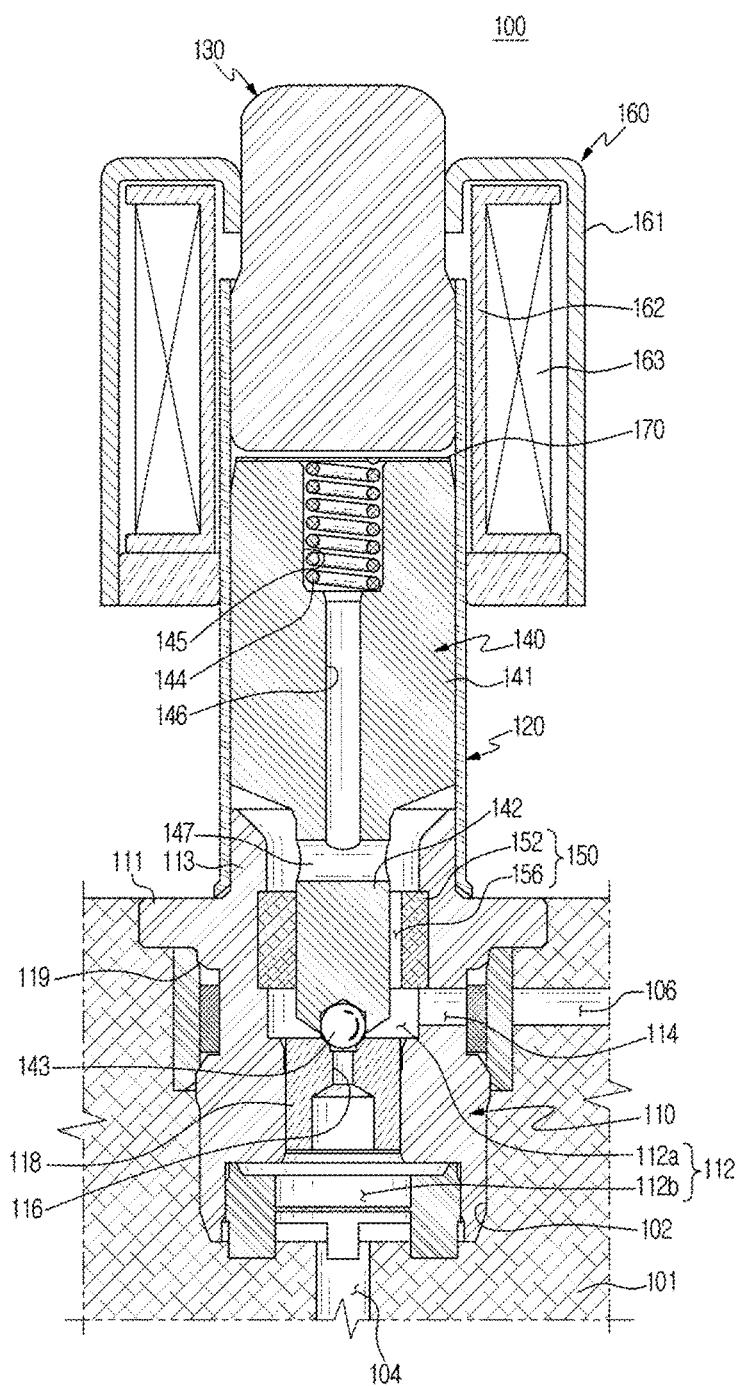

[Fig. 2]
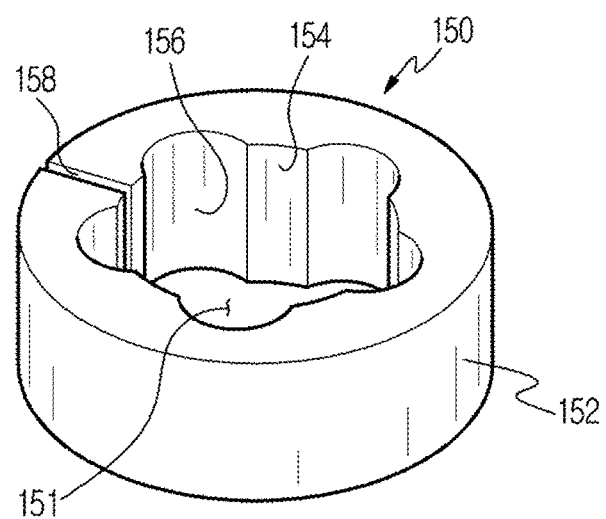

[Fig. 3]
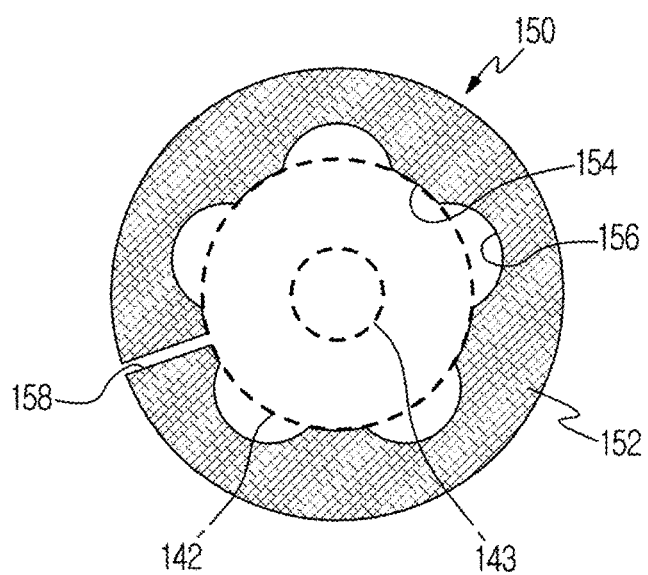

[Fig. 4]
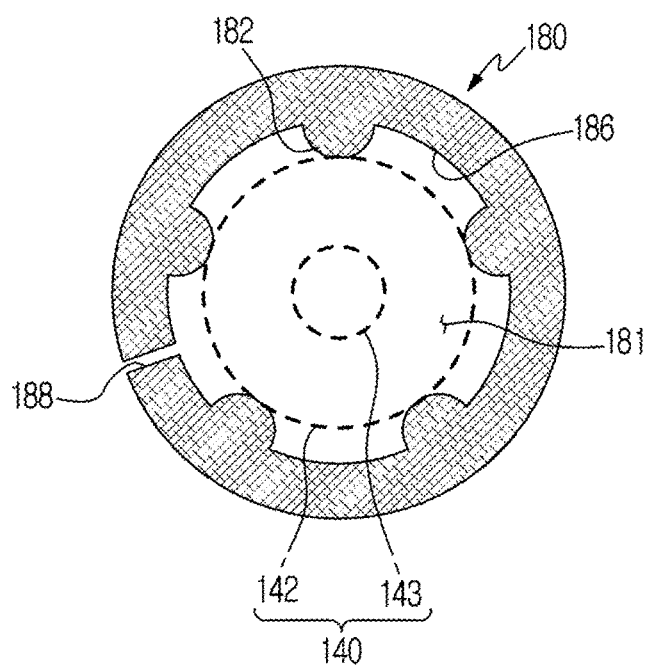

SOLENOID VALVE FOR BRAKE SYSTEM

CROSS-REFERENCE TO RELATED APPLICATION

This application claims the benefit of Korean Patent Application No. 2017-0020431, filed on Feb. 15, 2017 in the Korean Intellectual Property Office, the disclosure of which is incorporated herein by reference.

BACKGROUND

1. Field

Embodiments of the present disclosure relate to a solenoid valve for a brake system, and more particularly, to a solenoid valve for a brake system, capable of reducing noise and vibration during valve operation.

2. Description of the Related Art

A hydraulic brake system for braking is necessarily mounted in a vehicle. Recently, a variety of systems for obtaining a stronger and more stable braking force have been provided. As examples of a hydraulic brake system, there are an anti-lock brake system (ABS) configured to prevent sliding of wheels during braking, a brake traction control system (BTCS) configured to prevent slippage of driving wheels during sudden unintended acceleration or sudden acceleration, an electronic stability control system (ESC) configured to stably maintain a driving condition of a vehicle by controlling a hydraulic brake fluid by combining the ABS and BTCS, and the like.

In order to implement a brake system, a plurality of electronically controlled solenoid valves are installed in a modulator block and a flow path (hydraulic circuit) formed in the modulator block is selectively opened or closed by the solenoid valves. Solenoid valves are divided into normally open (NO) type solenoid valves which usually remain in an open state and normally closed (NC) type solenoid valves which usually remain in a closed state.

An NC type solenoid valve includes an orifice therein to allow a fluid (oil) to selectively move, and an armature installed to be movable upward and downward seals the orifice. The armature is accommodated in a cylindrical sleeve and selectively opens or closes the orifice due to an electromagnetic force of a magnet core provided above the sleeve to control a flow of the fluid.

Meanwhile, the armature which moves upward and downward while the solenoid valve operates may make a noise while a top side thereof collides with the magnet core and a bottom side thereof collides with the orifice. Since such operation noise may be introduced into a vehicle during braking and may be recognized by a driver, it is necessary to minimize the operation noise.

SUMMARY

Therefore, it is an aspect of the present disclosure to provide a solenoid valve for a brake system, configured to reduce noise and vibration which occur during operation.

Additional aspects of the present disclosure will be set forth in part in the description which follows and, in part, will be obvious from the description, or may be learned by practice of the present disclosure.

In accordance with one aspect of the present disclosure, a solenoid valve for a brake system includes a valve housing installed in a bore of a modulator block and configured to include an internal flow path, a valve sheet provided at the internal flow path of the valve housing and configured to include an orifice, an armature configured to be slidably moved up and down by a magnet core and to include an opening or closing sphere configured to selectively open or close the orifice, a sleeve configured to accommodate the armature therein and to have one end coupled to the valve housing and the other end at which the magnet core is provided, and a damper guide provided at the internal flow path of the valve housing to come into contact with and surround the armature.

The armature may include a large diameter portion configured to face the sleeve and a small diameter portion configured to include an opening or closing sphere in contact with the orifice inside the valve housing, and the damper guide may be provided at the small diameter portion.

The internal flow path of the valve housing may include a damper hole for accommodating the damper guide.

The damper guide may include a cylindrical body having a hollow and a flow hole recessed in an inner wall of the hollow.

The damper guide may include a cylindrical body having a hollow and a contact protrusion configured to protrude from an inner wall of the hollow.

The damper guide may include a hollow, and the hollow may include a sliding portion in contact with the armature and a flow path portion which does not come into contact with the armature.

Pluralities of such sliding portions and flow path portions may be alternately arranged in a circumferential direction.

The damper guide may include a cutting gap for insertion of the valve housing.

The cutting gap may be provided at the damper guide in parallel with a longitudinal direction of the armature and may form a gap flow path.

The solenoid valve may further include a return spring provided at the magnet core and the armature to apply an elastic force. Here, the return spring may apply an elastic force to the magnetic core and the armature so as to usually close the orifice.

BRIEF DESCRIPTION OF THE DRAWINGS

These and/or other aspects of the present disclosure will become apparent and more readily appreciated from the following description of the embodiments, taken in conjunction with the accompanying drawings of which:

FIG. 1 is a cross-sectional view of a normally closed type solenoid valve for a brake system according to one embodiment of the present disclosure;

FIG. 2 is a perspective illustrating a damper guide provided at an armature of the solenoid valve for a brake system according to one embodiment of the present disclosure;

FIG. 3 is a plan view illustrating the armature and the damper guide of the solenoid valve for a brake system according to one embodiment of the present disclosure; and FIG. 4 is a plan view illustrating an armature and a damper guide of a solenoid valve for a brake system according to another embodiment of the present disclosure.

DETAILED DESCRIPTION

Hereinafter, embodiments of the present disclosure will be described in detail with reference to the attached drawings. Here, the embodiments introduced below are provided as examples for allowing one of ordinary skill in the art to completely understand the technical concept of the present disclosure. Accordingly, the present disclosure is not limited to the embodiments described below and may be embodied in other forms. In addition, in order to clearly describe the present disclosure, parts irrelevant to a description will be omitted from the drawings. Throughout the drawings, a width, a length, a thickness, and the like of a component may be exaggerated. Throughout the specification, like reference numerals refer to like elements.

FIG. 1 is a cross-sectional view of a normally closed type solenoid valve for a brake system (hereinafter, referred to as a solenoid valve for a brake system) according to one embodiment of the present disclosure.

A solenoid valve 100 for a brake system according to the embodiment includes a valve housing 110, a sleeve 120, a magnet core 130, an armature 140, and an excitation coil assembly 160.

The valve housing 110 is press-fitted and installed in a bore 102 of a modulator block 101. The valve housing 110 includes a first oil flow path 112 which vertically passes through an inside along a longitudinal direction and a second oil flow path 114 configured to allow the inside and an outside of the valve housing 110 to communicate with each other in a circumferential direction. The first oil flow path 112 in an upward and downward direction may be divided into a first inner oil flow path 112a and a first outer oil flow path 112b by a valve sheet which will be described below. The first outer oil flow path 112b is formed at a bottom side of the valve housing 110 and communicates with an outflow path 104 of the modulator block 101, and the second oil flow path 114 communicates with an inflow path 106 of the modulator block 101.

A valve sheet 118 with an orifice 116 may be provided in the valve housing 110 and may be press-fitted therein when the valve housing 110 is assembled. The valve sheet 118, as shown in the drawings, allows the first inner oil flow path 112a and the first outer oil flow path 112b to selectively communicate with each other through the orifice 116 when the valve is opened or closed. The second oil flow path 114 is formed near a top side of the valve sheet 118 and allows the inflow path 106 and the first inner oil flow path 112a to communicate with each other.

A filter 119 which filters out foreign matter in oil which flows through the inflow path 106 of the modulator block 101 may be provided at an outer side of the second oil flow path 114 of the valve housing 110. The filter 119 may be assembled or integrated with the valve housing 110, like the valve sheet 118.

Also, an enlarged diameter portion 111 for installing the valve housing 110 in the modulator block 101 and a flange 113 which protrudes upward for coupling the sleeve 120 may be formed on an outer surface of a top of the valve housing 110.

The sleeve 120 has a cylindrical shape with an open top and bottom, and a bottom side of the sleeve 120 is coupled to the flange 113 provided on the outer surface of the valve housing 110. When the sleeve 120 and the valve housing 110 are coupled to each other, the oil which has passed through the filter 119 may flow into the sleeve 120 through the second oil flow path 114 and the first inner oil flow path 112a.

The magnet core 130 is press-fitted into and coupled to a top side of the sleeve 120 and closes the open top of the sleeve 120. Although not shown in the drawings, for tighter coupling between the magnet core 130 and the sleeve 120, a coupling groove may be formed in the magnet core 130 and the sleeve 120 may be pressed to be caught by the coupling groove and assembled. Such a coupling structure, compared with a conventional welding method, may easily couple the sleeve 120 with the magnet core 130 and may simplify a coupling process thereof.

The armature 140 is installed in the sleeve 120 to be able to vertically advance and retreat and includes a large diameter portion 141 and a small diameter portion 142.

The large diameter portion 141 faces the sleeve 120 in close proximity, and although not shown in FIG. 1, is vertically surface-processed such that a vertical flow path may be provided between the large diameter portion 141 and the sleeve 120. The small diameter portion 142 is located to be spaced apart from an inside wall of the flange 113 of the valve housing 110, and an end thereof comes into contact with the valve sheet 118 in the valve housing 110.

An opening and closing sphere 143 capable of opening or closing the orifice 116 of the valve sheet 118 is provided at the end of the small diameter portion 142 of the armature 140. The opening or closing sphere 143 selectively opens or closes the orifice 116 due to forward or backward movement of the armature 140.

A return spring 144 which usually presses the armature 140 against the valve sheet 118 is provided between the armature 140 and the magnet core 130. The return spring 144 is accommodated in a spring accommodation groove 145 formed in a top of the armature 140. The return spring 144 accommodated in the spring accommodation groove 145 presses the armature 140 against the valve sheet 118 from the magnet core 130 such that the opening or closing sphere 143 usually closes the orifice 116 (a normally closed type). The spring accommodation groove 145 is connected to a first through flow path 146 which longitudinally transverses the large diameter portion 141 and the small diameter portion 142, and the first through flow path 146 communicates with the first inner oil flow path 112a of the valve housing 110 through a second through flow path 147 which laterally transverses the small diameter portion 142.

A damper guide 150 which includes a Teflon material having certain elasticity may be provided at a body of the small diameter portion 142 between the second through flow path 147 and the opening or closing sphere 143 of the armature 140.

As shown in FIG. 2, the damper guide 150 includes a cylindrical body 152 having a hollow 151 and a plurality of arc-shaped flow holes 156 which are provided at certain intervals in an inner wall 154 of the hollow 151. The inner wall 154 of the damper guide 150 comes into contact with the armature 140 and increases a frictional force while the armature 140 vertically operates such that a damping force may be exerted. A damping effect, for example, may reduce the noise of a collision between magnet core 130 and the armature 140 or the noise of a collision between the opening or closing sphere 143 and the valve sheet 118. The flow holes 156 are for adjusting a contact area between the armature 140 and the damper guide 150 such that excessive adhesion between the armature 140 and the damper guide 150 may be suppressed and a smooth flow of a fluid may be induced.

Also, the damper guide 150 may include a cutting gap 158 in a thickness direction of the body 152 in parallel with a longitudinal direction of the armature 140. A damper hole may be provided in an inner wall which forms the first inner oil flow path 112a of the valve housing 110, and the damper guide 150 may be inserted into the damper hole by reducing an outer diameter using the cutting gap 158 and then may return to an original shape using elasticity. That is, the cutting gap 158 is for facilitating assembly with the valve housing 110. However, since the cutting gap 158 is provided to be open in parallel with the longitudinal direction of the armature 140, the cutting gap 158 may be used as a cap flow path which induces a flow of a fluid.

The excitation coil assembly 160 for advancing and retreating of the armature 140 in a vertical direction is installed on the magnet core 130 and an outer surface of the upper sides of the sleeve 120. The excitation coil assembly 160 includes a cylindrical coil case 161, a bobbin 162 accommodated in the coil case 161, and an excitation coil 163 wound on an outer surface of the bobbin 162. The excitation coil assembly 160 generates a magnetic field when power is applied to the excitation coil 163 and moves the armature 140 toward the magnet core 130 to open the orifice 116. A reference numeral 170 which is not described above refers to a sole core for removing a residual magnetic force between the magnet core 130 and the armature 140.

When the solenoid valve 100 is mounted in the modulator block 101, the valve housing 110 coupled to the sleeve 120 is inserted into the bore 102 of the modulator block 101, and in this state, an inlet side of the bore 102 of the modulator block 101 is modified (caulked). Then, in the modulator block 101 made of an aluminum material, due to the caulking modification, the inlet of the bore 102 surrounds the enlarged diameter portion 111 of the valve housing 110 and the end of the sleeve 120 to firmly fasten the valve.

Next, an opening or closing operation of the solenoid valve for a brake system, which has the above-described structure, will be described.

First, as shown in FIG. 1, when power is not applied to the excitation coil assembly 160, since the return spring 144 pushes the armature 140 against the orifice 116, the opening or closing sphere 143 closes the orifice 116. Accordingly, here, oil does not flow from the inflow path 106 of the modulator block 101 toward the outflow path 104.

When power is applied to the excitation coil assembly 160, the armature 140 overcomes an elastic force of the return spring 144 and moves toward the magnet core 130 due to a magnetic force which acts between the armature 140 and the magnet core 130 such that the opening or closing sphere 143 becomes spaced apart from the orifice 116 and opens the orifice 116. When the orifice 116 is opened, the oil introduced through the inflow path 106 passes through the filter 119, flows into the first inner oil flow path 112*a* through the second oil flow path 114 of the valve housing 110, passes through the orifice 116 and the first outer oil flow path 112*b*, and flows out through the outflow path 104.

Also, when the valve operates, since the upward and downward movement of the armature 140 is damped by the damper guide 150, the noise of collisions among the armature 140, the magnet core 130, and the valve sheet 118 may be reduced and, additionally, the tilting of the armature 140 is minimized such that reactive and leakage characteristics may be improved. Also, since the plurality of flow holes 156 are provided at certain intervals along the inner wall 154 of the hollow 151 in the damper guide 150 as shown in FIG. 3, a working fluid may smoothly flow between the sleeve 120 and the armature 140 through the flow holes 156.

Here, although it has been exemplified above that the damper guide 150 includes the hollow 151 in contact with the armature 140 and the plurality of flow holes 156 having a groove shape are recessed in the inner wall 154 of the hollow 151 at certain intervals, the present disclosure is not limited thereto. For example, as shown in FIG. 4, a hollow 181 of a damper guide 180 may include a plurality of contact protrusions 182 which come into contact with the armature 140 and protrude from an inner wall which forms flow holes 186.

That is, the hollows 151 and 181 of the damper guides 150 and 180 may include a shape in which sliding portions, such as the inner wall 154 or the contact protrusions 182, which come into contact with the armature 140 and the flow portions, such as the flow holes 156 or 186, which do not come into contact with the armature 140 are recessed or protrude, respectively. Pluralities of such sliding portions and the flow portions may alternately arranged to be symmetrical in a circumferential direction and may come into contact with the armature 140 with uniform pressure. A reference numeral 188 which is not described above refers to a cutting gap.

Also, although the normally closed (NC) type solenoid valve in which the return spring is provided between the magnet core and armature to usually close the orifice has been described above as an example, the present disclosure is not limited thereto. It should be appreciated that a normally open (NO) type solenoid valve in which a return spring operates to usually open an orifice may be applied through adequate modification and change made by one of ordinary skill in the art.

As is apparent from the above description, in a solenoid valve for a brake system according to the embodiments of the present disclosure, since a damper guide is provided in a valve housing, in which a small diameter portion of an armature is located, and guides vertical upward and downward movement, the noise of collisions among the armature, a magnet core, and a valve sheet can be reduced as well as the tilting of the armature is minimized such that reactive and leakage characteristics can be increased.

Although a few embodiments of the present disclosure have been shown and described, it would be appreciated by those skilled in the art that changes may be made in these embodiments without departing from the principles and spirit of the present disclosure, the scope of which is defined in the claims and their equivalents.

What is claimed is:
1. A solenoid valve for a brake system, comprising:
   a valve housing installed in a bore of a modulator block and configured to include an internal flow path;
   a valve seat provided at the internal flow path of the valve housing and configured to include an orifice;
   an armature configured to be slidably moved up and down by a magnet core and to include an opening or closing sphere configured to selectively open or close the orifice;
   a sleeve configured to accommodate the armature therein and to have one end coupled to the valve housing and the other end at which the magnet core is provided; and
   a damper guide disposed on a groove formed on an inner surface of the internal flow path of the valve housing to come into contact with and surround the armature.

2. The solenoid valve of claim 1, wherein the armature comprises a large diameter portion configured to face the sleeve and a small diameter portion configured to include an opening or closing sphere in contact with the orifice inside the valve housing, and
   wherein the damper guide is provided at the small diameter portion.

3. The solenoid valve of claim 1, wherein the damper guide comprises:
   a cylindrical body having a hollow; and
   a flow hole recessed in an inner wall of the hollow.

4. The solenoid valve of claim 1, wherein the damper guide comprises:
   a cylindrical body having a hollow; and a contact protrusion configured to protrude from an inner wall of the hollow.

5. The solenoid valve of claim 1, further comprising a return spring provided at the magnet core and the armature to apply an elastic force,
   wherein the return spring applies an elastic force to the magnetic core and the armature so as to usually close the orifice.

6. The solenoid valve of claim 1, wherein the damper guide is spaced apart from the valve seat.

7. The solenoid valve of claim 1, wherein the damper guide comprises a hollow, and
   wherein the hollow comprises a sliding portion in contact with the armature and a flow path portion which does not come into contact with the armature.

8. The solenoid valve of claim 7, wherein pluralities of such sliding portions and flow path portions are alternately arranged in a circumferential direction.

9. The solenoid valve of claim 1, wherein the damper guide comprises a cutting gap for insertion of the valve housing.

10. The solenoid valve of claim 9, wherein the cutting gap is provided in the damper guide in parallel with a longitudinal direction of the armature and forms a gap flow path.

\* \* \* \* \*